(No Model.)  F. S. CHURCH.  5 Sheets—Sheet 1.
CASH CARRIER.

No. 417,147.  Patented Dec. 10, 1889.

Fig. 2ª

WITNESSES  INVENTOR
C. J. Shipley  Frank S. Church
L. A. Doelty  By Wills W. Leggett & Co.
  Attorneys.

(No Model.) 5 Sheets—Sheet 2.

F. S. CHURCH.
CASH CARRIER.

No. 417,147. Patented Dec. 10, 1889.

WITNESSES
C. J. Shipley
L. A. Doelty

INVENTOR
Frank S. Church
By Wells W. Leggett & Co.
Attorneys.

(No Model.)  F. S. CHURCH.  5 Sheets—Sheet 3.
CASH CARRIER.
No. 417,147.  Patented Dec. 10, 1889.
Fig. 5.
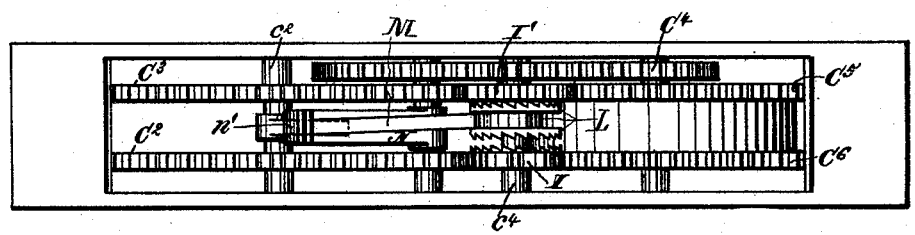
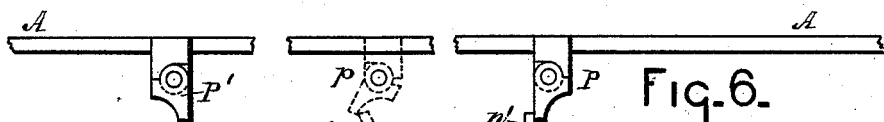
Fig. 6.
Fig. 7.
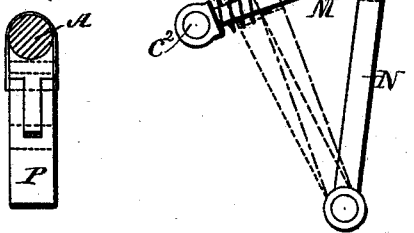
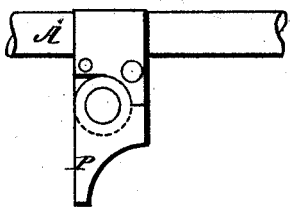
Fig. 8.
Fig. 9.
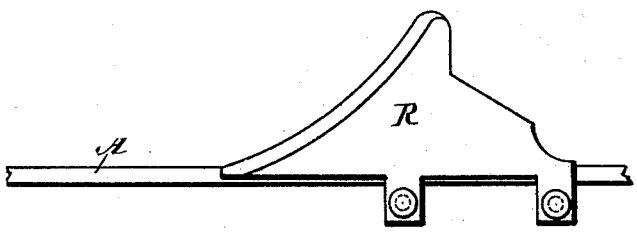
Fig. 10.
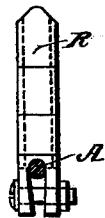
WITNESSES
C. J. Shipley
L. A. Doeltz
INVENTOR
Frank S. Church
By Willis W. Leggett & Co.
Attorneys.

(No Model.)  
F. S. CHURCH.  
CASH CARRIER.

No. 417,147. Patented Dec. 10, 1889.

5 Sheets—Sheet 4.

WITNESSES  
C. J. Shipley  
L. A. Daelty

INVENTOR  
Frank S. Church  
By Wells W. Eggers & Co.  
Attorneys.

(No Model.) 5 Sheets—Sheet 5.
F. S. CHURCH.
CASH CARRIER.
No. 417,147. Patented Dec. 10, 1889.
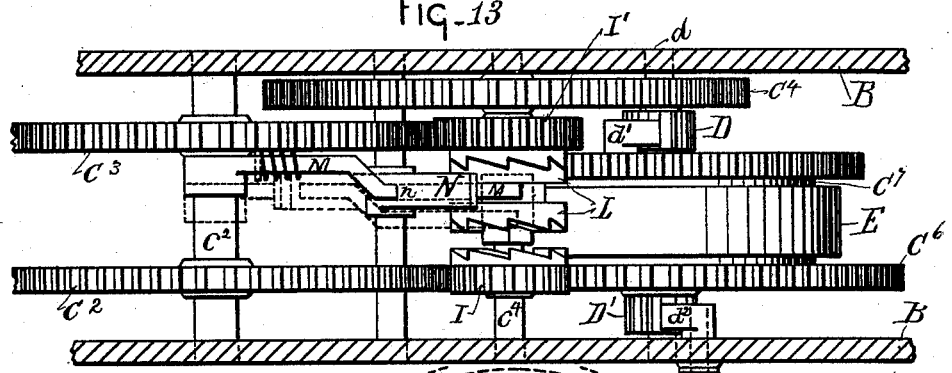
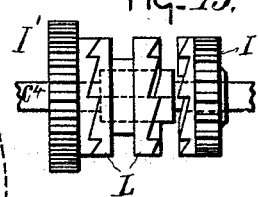
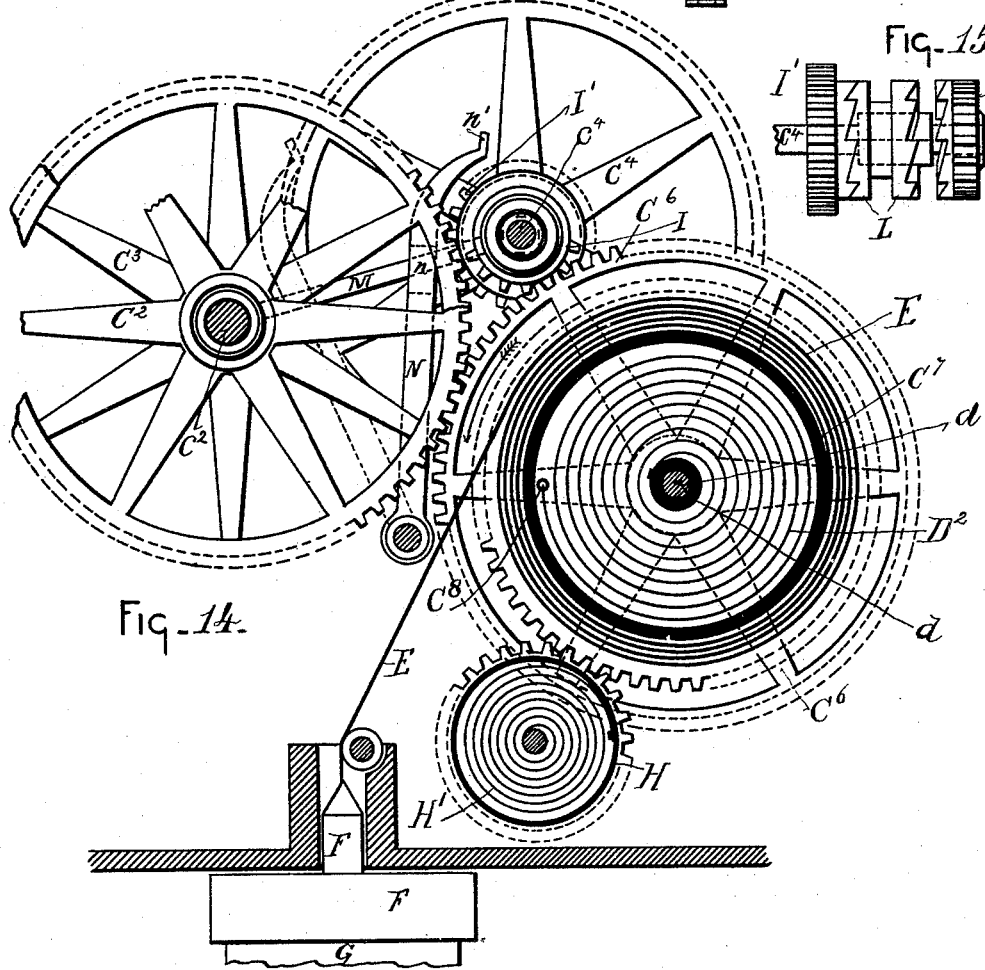
WITNESSES
C. J. Shipley
F. Clough
INVENTOR
Frank S. Church
By Wells H. Leggett & Co
Attorneys.

UNITED STATES PATENT OFFICE.

FRANK. S. CHURCH, OF DETROIT, MICHIGAN, ASSIGNOR OF ONE-HALF TO
J. LOGAN CHIPMAN, OF SAME PLACE, AND E. H. PLUMMER.

CASH-CARRIER.

SPECIFICATION forming part of Letters Patent No. 417,147, dated December 10, 1889.

Application filed June 15, 1889. Serial No. 314,372. (No model.)

*To all whom it may concern:*

Be it known that I, FRANK. S. CHURCH, a citizen of the United States, residing at Detroit, county of Wayne, State of Michigan, have invented a certain new and useful Improvement in Cash-Carriers; and I declare the following to be a full, clear, and exact description of the invention, such as will enable others skilled in the art to which it pertains to make and use the same, reference being had to the accompanying drawings, which form a part of this specification.

Figure 1:
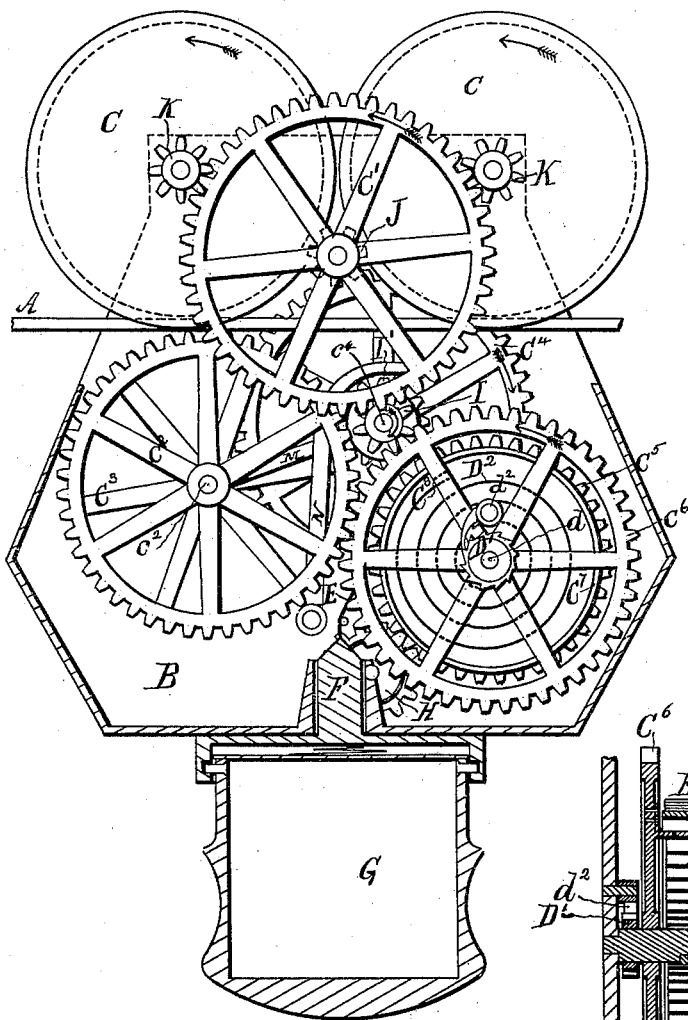
Figure 2:
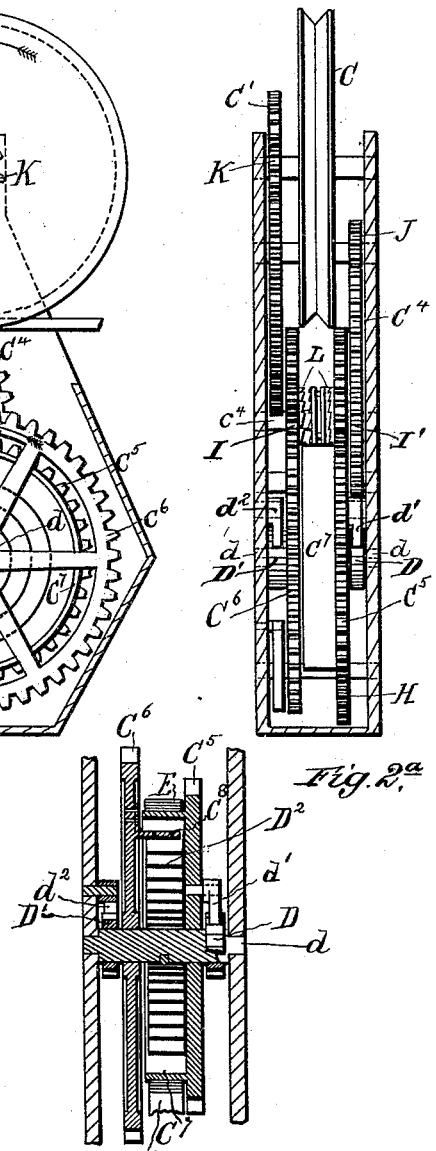
Figure 3:
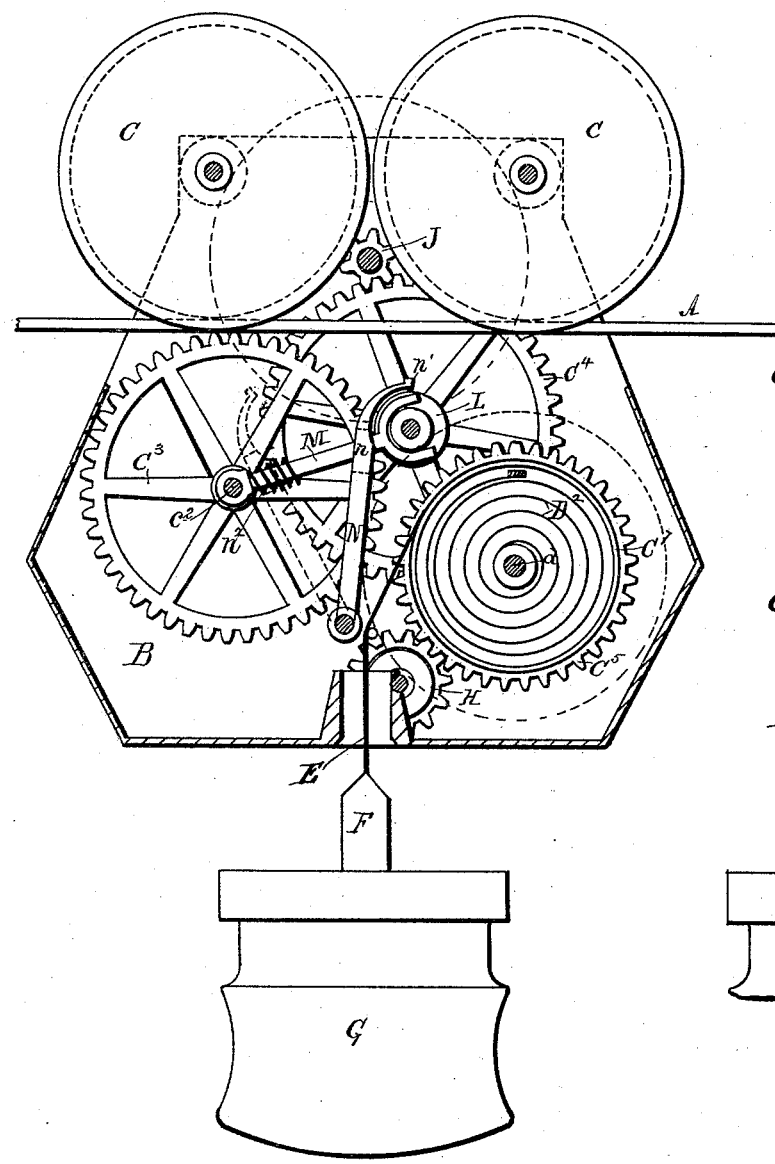
Figure 4:
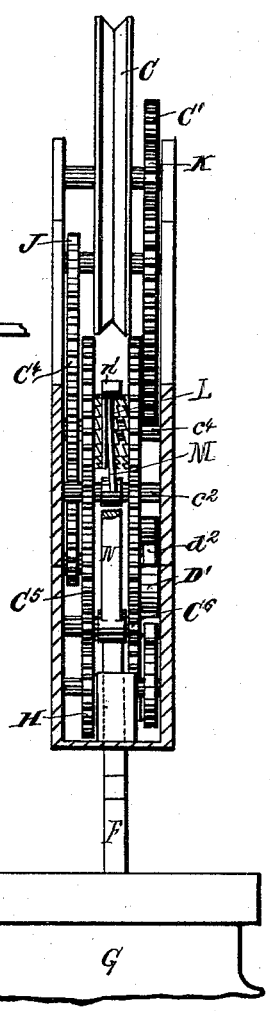
Figure 11:
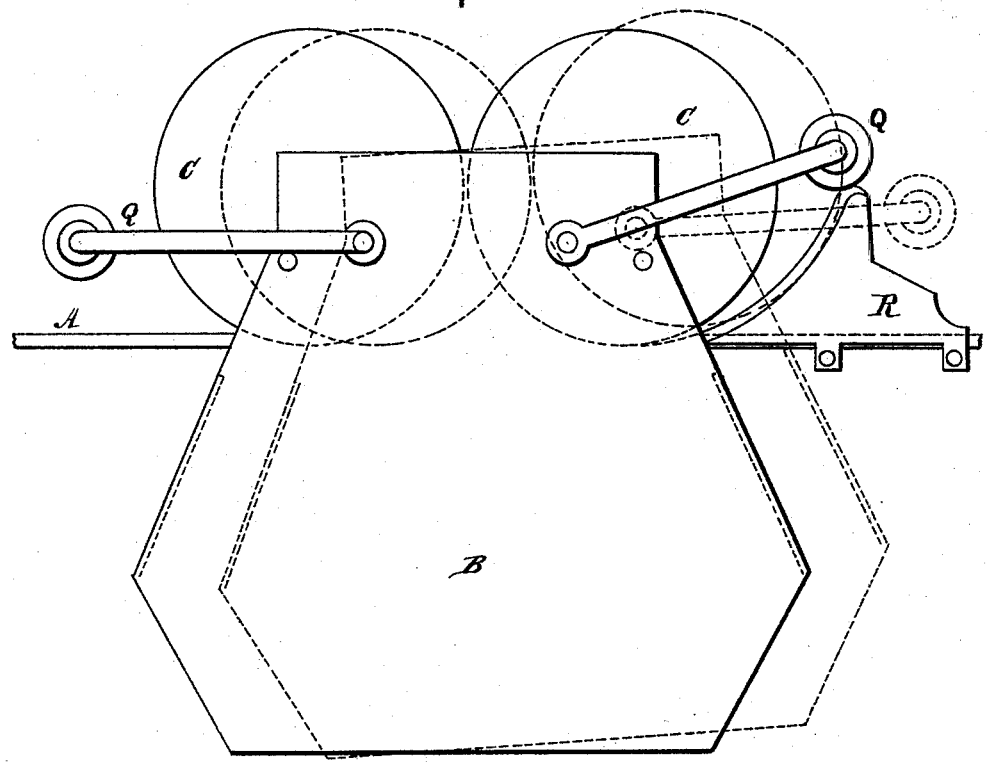
Figure 12:
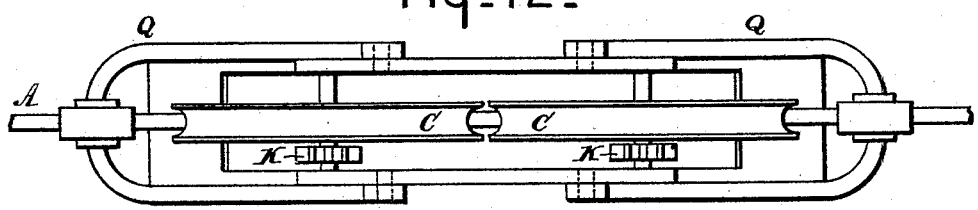

In the drawings, Figure 1 is a side elevation of a cash or package carrier embodying my invention, with parts broken away to illustrate the gearing. Fig. 2 is an end elevation of the same. Fig. $2^a$ is a vertical section taken through the actuating-drum. Fig. 3 is a sectional view illustrating parts in elevation, viewed from the side opposite that shown in Fig. 1. Fig. 4 is an end elevation from the end opposite that shown in Fig. 2. Fig. 5 is a plan view with the carrier-wheels removed and illustrating more particularly the reversing mechanism. Fig. 6 illustrates the reversing-lever with its actuating-trip. Fig. 7 is an end elevation, and Fig. 8 a side elevation, of the trip enlarged. Fig. 9 is the stop for engaging the car at the end of the route. Fig. 10 is an end elevation of the same. Fig. 11 illustrates the car in the act of engaging the stop. Fig. 12 is a plan view. Fig. 13 is an enlarged plan view with the carrier-wheels removed and the carrier-casing broken away. Fig. 14 is an enlarged sectional view with the carrier-wheels removed. Fig. 15 is a detail view of the clutch.

My invention relates to cash-carriers, and more particularly to that class in which the mechanism for actuating the carrier is embodied within the carrier itself; and it has for its object certain improvements in the actuating mechanism and also in the other mechanism related thereto, as more particularly hereinafter pointed out in the specification, and set forth in the claims.

In carrying out my invention, A represents the track or way; G, the cash-box or package-holder.

B is the carrier. The carrier consists, essentially, of supporting-wheels C, grooved to engage the line or way, these being geared by intermediate gears $C'$, $C^2$, $C^3$, $C^4$, and $C^5$ with the gear $C^6$, which in turn engages with the drum $C^7$, which contains the actuating-spring $D^2$. This spring is in the usual way engaged at its center to the shaft $d$ and at its periphery to the lug $C^8$, which projects from the gear-wheel $C^6$.

D and $D'$ are ratchet-wheels fixed to the shaft $d$, and $d'$ and $d^2$ are pawls adapted to engage said ratchets.

E is a strap wound on the drum $C^7$.

F is the cash-box support. It is engaged at its upper end to the strap E and is adapted to receive the cash or parcel holder G.

H is a drum provided with a gear at its edge and containing an interior spring $H'$. The gear of this drum meshes with the gear of the drum $C^7$.

The operation of this part of the device will now be understood. The operator grasps the cash or package holder G and pulls it down before disengaging it from its holder or support F. This draws down the strap E, and so revolves the drum $C^7$. At the same time the pawl $d'$ engages the ratchet D and causes the shaft $d$ to revolve with it, thus winding the spring $D^2$, the outer end of the spring being held by the lug $C^8$ on the wheel $C^6$, which remains stationary. As the shaft $d$ turns, the pawl $d^2$ rides over the ratchet $D'$. As the drum $C^7$ revolves it turns the drum H and winds up its interior spring $H'$, so that when the cash-box support F is released the spring $H'$ will turn the drum $C^7$ back around its shaft, thereby again winding the strap upon it. As this drum turns backward the pawl $d'$ will ride over the ratchet D, while the pawl $d^2$ will engage the ratchet $D'$. The shaft $d$ is therefore held stationary and the spring $D^2$ is not permitted to retract. Now, if the car is released or permitted to hang freely on the wire, the main spring $C^7$ will cause the wheel $C^6$ to move in the direction of the arrow in Fig. 1. This gears into the pinion I and turns it in the direction of the arrow, carrying with it the wheel $C^4$. This latter wheel gears into the pinion J, which drives the wheel $C'$ in the direction of the arrow, and this in turn gears with the pinions K, turning the wheels C, as indicated by the arrows, and causing the car to traverse along the wire toward the left.

The direction of travel of the carrier is changed by an automatic reversing mechanism, and this I prefer to accomplish as follows: $c^4$ is the shaft, to which the large wheel $C^4$ is permanently fixed. The pinions I I' are both loosely journaled thereon. A clutch L is engaged therewith by a spline or upon a squared portion of the shaft, and may be slid longitudinally of the shaft, so as to engage with either the pinion I or I'. When it is engaged with the pinion I', then the pinion I will run idly on the shaft. The result then is that the wheel $C^6$ turns the wheel $C^2$ and with it the wheel $C^3$, both being rigidly fastened upon the shaft $C^2$. The wheel $C^3$ engages the pinion I', which causes the wheel $C^4$ to move in the direction opposite that indicated by the arrow, and this results, through the pinion J, wheel C', and pinions K, in causing the car to move in a direction to the right, and so carries the car back to its starting-point.

I will now describe how this clutch L is shifted automatically at each end of the route. M is the clutch-lever. At its heel it is loosely engaged with the shaft $c^2$. N is a shifting-bar. It embraces the clutch-lever at $n$ and is provided with a projecting ear $n'$ at its end. The clutch-lever M is inclined from the shaft $c^2$ to the clutch, as shown in Figs. 5 and 13. It is now apparent that when the shifting-bar N is in the position shown by the full lines in Figs. 13 and 14 it will crowd against the clutch-bar M and force the clutch into engagement with the pinion I', with the result of causing the car to move to the right under the action of the spring, while if the shifting-lever N is forced into the position shown by the dotted lines it will crowd the clutch-bar so as to force the clutch L into engagement with the loose pinion I', with the result of moving the car to the left, as explained. P and P' are trips located, respectively, at the right-hand and the left-hand ends of the track. Now, if the car has nearly reached the station at the right, the ear $n'$, Fig. 6, will strike the trip P, thus forcing the shifting-lever N back to the position N', when it will ride beneath the said trip. A spring-cushion $n^2$ will then lift the lever slightly into the position shown at $N^2$. In the meantime the bail Q, Fig. 11, will have ridden over and engaged behind the stop R. Now, when the car is ready to start back, the operator lifts the bail free from the stop R. The car at once starts back on the return-trip. The ear $n'$ rides past the trip P, the latter yielding, as shown at $p$, to permit it to pass. Then, when close to the starting-point, the ear $n'$ strikes the trip P', forcing the lever into the position shown in the full lines, Fig. 6. It then rides onto a stop R at the left-hand end of the line. Here the salesman, by drawing down the cash-box, pulls down the strap E, thus rewinding the spring $D^2$, and the operation is repeated.

What I claim is—

1. The combination, with a cash or parcel carrier provided with spring-actuated propelling-gearing, of automatic reversing mechanism connected with said gearing to change the direction of movement of the propelling mechanism as the carrier reaches the end of the line, substantially as described.

2. The combination, with a cash or parcel carrier, of spring-actuated gearing located thereon, adapted to propel the same, reversing mechanism connected therewith, and a stop connected to the track adapted to be struck by the carrier to automatically operate the reversing mechanism as the car approaches either end of the track, substantially as described.

3. The combination, with a cash or parcel carrier, of spring-actuated gearing located thereon and adapted to propel the same, reversing mechanism connected therewith, a stop connected to the track, adapted to be struck by the carrier to automatically operate the reversing mechanism as the car approaches either end of the track, and a stop and retaining mechanism adapted to engage and hold the car immediately after the actuating mechanism has been reversed, substantially as described.

4. The combination, with a cash or parcel carrier, of a spring-actuated drum located thereon, gearing connecting said drum with the track-wheels, a lever engaged with said gearing, and stops on the track adapted to operate said lever to change the direction of movement of the gearing, substantially as described.

In testimony whereof I sign this specification in the presence of two witnesses.

FRANK. S. CHURCH.

Witnesses:
WELLS W. LEGGETT,
L. A. DOELTZ.